US011687596B2

United States Patent
McLeod et al.

(10) Patent No.: US 11,687,596 B2
(45) Date of Patent: Jun. 27, 2023

(54) SYSTEMS AND METHODS FOR AUTOMATIC GENERATION OF DATA VISUALIZATIONS

(71) Applicant: MicroStrategy Incorporated, Tysons Corner, VA (US)

(72) Inventors: Jericho McLeod, Arlington, VA (US); Niyati Shah, Falls Church, VA (US); Amar Gawade, Herndon, VA (US)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 0 days.

(21) Appl. No.: 17/207,924

(22) Filed: Mar. 22, 2021

(65) Prior Publication Data

US 2021/0303625 A1  Sep. 30, 2021

Related U.S. Application Data

(60) Provisional application No. 63/002,392, filed on Mar. 31, 2020.

(51) Int. Cl.
| | |
|---|---|
| *G06F 16/904* | (2019.01) |
| *G06F 16/9538* | (2019.01) |
| *G06F 16/9535* | (2019.01) |
| *G06F 16/906* | (2019.01) |

(52) U.S. Cl.
CPC ........ *G06F 16/904* (2019.01); *G06F 16/906* (2019.01); *G06F 16/9535* (2019.01); *G06F 16/9538* (2019.01)

(58) Field of Classification Search
CPC .. G06F 16/904; G06F 16/906; G06F 16/9535; G06F 16/9538
See application file for complete search history.

(56) References Cited

U.S. PATENT DOCUMENTS

| | | | |
|---|---|---|---|
| 2012/0203457 A1* | 8/2012 | Casey | H04W 4/024 455/457 |
| 2016/0210273 A1* | 7/2016 | Kelappan | G06F 40/197 |
| 2017/0061659 A1* | 3/2017 | Puri | G06F 16/23 |
| 2020/0097412 A1* | 3/2020 | Chakra | G06F 12/0862 |
| 2020/0125900 A1* | 4/2020 | Posner | G06K 9/6284 |

* cited by examiner

*Primary Examiner* — Amresh Singh
*Assistant Examiner* — Fatima P Mina
(74) *Attorney, Agent, or Firm* — Bookoff McAndrews, PLLC

(57) ABSTRACT

A computer-implemented method for automatic generation of data visualizations may include: receiving, from a user, a request to open a document, receiving, from the user, a selection of data for visualization in the new document, determining whether the user has a trained visualization model, upon determining that the user has a trained visualization model, loading the user's trained visualization model, upon determining that the user does not have a trained visualization model, loading a default trained visualization model as the user's trained visualization model, using the user's trained visualization to generate one or more suggested visualizations of the selected data, and displaying the one or more suggested visualizations to the user.

14 Claims, 6 Drawing Sheets

SYSTEMS AND METHODS FOR AUTOMATIC GENERATION OF DATA VISUALIZATIONS

RELATED APPLICATION(S)

This application claims priority to U.S. Provisional Application No. 63/002,392 filed Mar. 31, 2020, the entire disclosure of which is hereby incorporated herein by reference in its entirety.

TECHNICAL FIELD

Various embodiments of the present disclosure relate generally to data visualization and, more particularly, to automatic generation of data visualizations based on attributes of data selected by a user.

BACKGROUND

When opening a new dataset in a visualization application, users may have difficulty selecting a proper visualization for the selected data. The present disclosure is directed to overcoming one or more of these above-referenced challenges.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the present disclosure, systems and methods are disclosed for automatic generation of data visualizations.

In one embodiment, a computer-implemented method is disclosed for automatic generation of data visualizations, the method comprising: receiving, from a user, a request to open a document, receiving, from the user, a selection of data for visualization in the new document, determining whether the user has a trained visualization model, upon determining that the user has a trained visualization model, loading the user's trained visualization model, upon determining that the user does not have a trained visualization model, loading a default trained visualization model as the user's trained visualization model, using the user's trained visualization to generate one or more suggested visualizations of the selected data, and displaying the one or more suggested visualizations to the user.

In accordance with another embodiment, a system is disclosed for automatic generation of data visualizations, the system comprising: a data storage device storing instructions for automatic generation of data visualizations in an electronic storage medium; and a processor configured to execute the instructions to perform a method including: receiving, from a user, a request to open a document, receiving, from the user, a selection of data for visualization in the new document, determining whether the user has a trained visualization model, upon determining that the user has a trained visualization model, loading the user's trained visualization model, upon determining that the user does not have a trained visualization model, loading a default trained visualization model as the user's trained visualization model, using the user's trained visualization to generate one or more suggested visualizations of the selected data, and displaying the one or more suggested visualizations to the user.

In accordance with another embodiment, a non-transitory machine-readable medium storing instructions that, when executed by the a computing system, causes the computing system to perform a method for automatic generation of data visualizations, the method including: receiving, from a user, a request to open a document, receiving, from a user, a request to open a document, receiving, from the user, a selection of data for visualization in the new document, determining whether the user has a trained visualization model, upon determining that the user has a trained visualization model, loading the user's trained visualization model, upon determining that the user does not have a trained visualization model, loading a default trained visualization model as the user's trained visualization model, using the user's trained visualization to generate one or more suggested visualizations of the selected data, and displaying the one or more suggested visualizations to the user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to enabling voice control of an interactive audio-visual environment, and monitoring user behavior to assess engagement.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
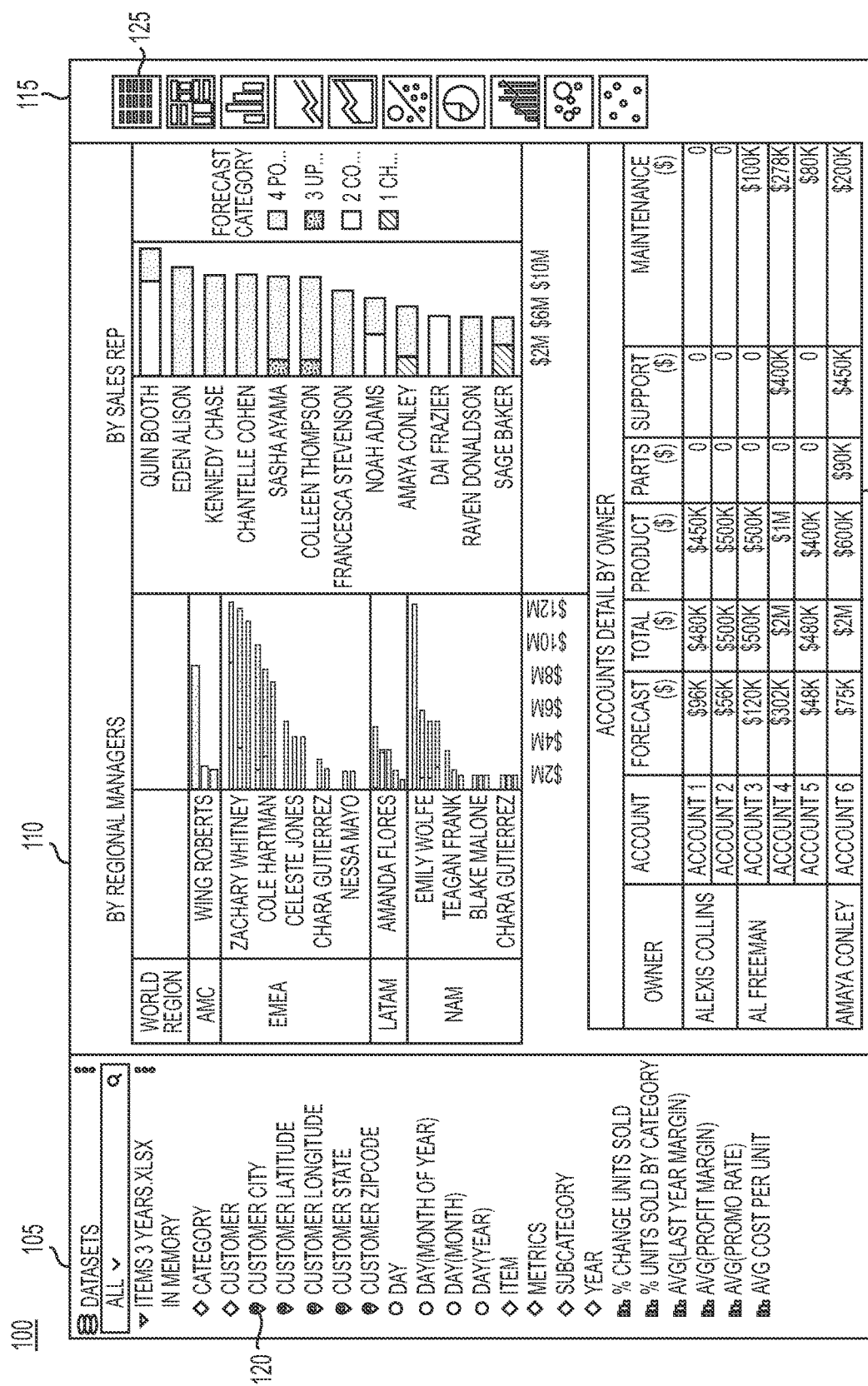
FIG. 1 depicts an exemplary user interface for data visualization, according to one or more embodiments.

As discussed above, when opening a new dataset in a visualization application, such as an application running on a computer workstation, personal computer, laptop, tablet, mobile device, or any other suitable computing platform, users may have difficulty selecting a proper visualization for the selected data. For example, when a user opens a common visualization application, the user may be presented with a user interface such user interface 100 depicted in FIG. 1. As shown in FIG. 1, a user interface for visualization 100 may include a canvas area 110 in which the visualization may be composed and previewed. User interface for visualization 100 may also include a data selection pane 105 in which the user may select data items, such as data item 120, for visualization. For example, the user may select a data source, such as a database, residing on a local server or may select a data source accessible over a network, such as a local area network or the internet. Once a data source is selected, the user may select data items 120 from among the data items stored in the data source. User interface for visualization 100 may further include a library 115 of visualization types from which the user may choose sample visualization elements 125, to be used in the visualization. Sample visualization elements 125 may include, for example, tables, bar charts, line charts, pie charts, scatter plots, etc. The user may move one or more sample visualization elements 125 from library 115 to canvas area 110 to be used in the visualization. Visualization elements 125 may be moved from library 115 to canvas area 110 by clicking and dragging, by contextual menus, or by any other suitable means. Once moved to canvas area 110, visualization elements 125 may be partially initialized for viewing. For example, data elements 120 selected in data selection pane 105 may be used to initialize visualization elements 125 to create rendered visualizations, such as table 130 and other visualizations shown in FIG. 1. However, the user is not guided in the selection of visualization elements 125 or in the association of data item 120 with parameters of visualization elements 125. This may result in a lengthy process of trial-and-error selection and configuration of visualization elements 125, or in ineffective visualizations resulting from inappropriate or less than optimal choices made for visualization elements 125 or in the association of data item 120 with parameters of visualization elements 125.

Figure 2:
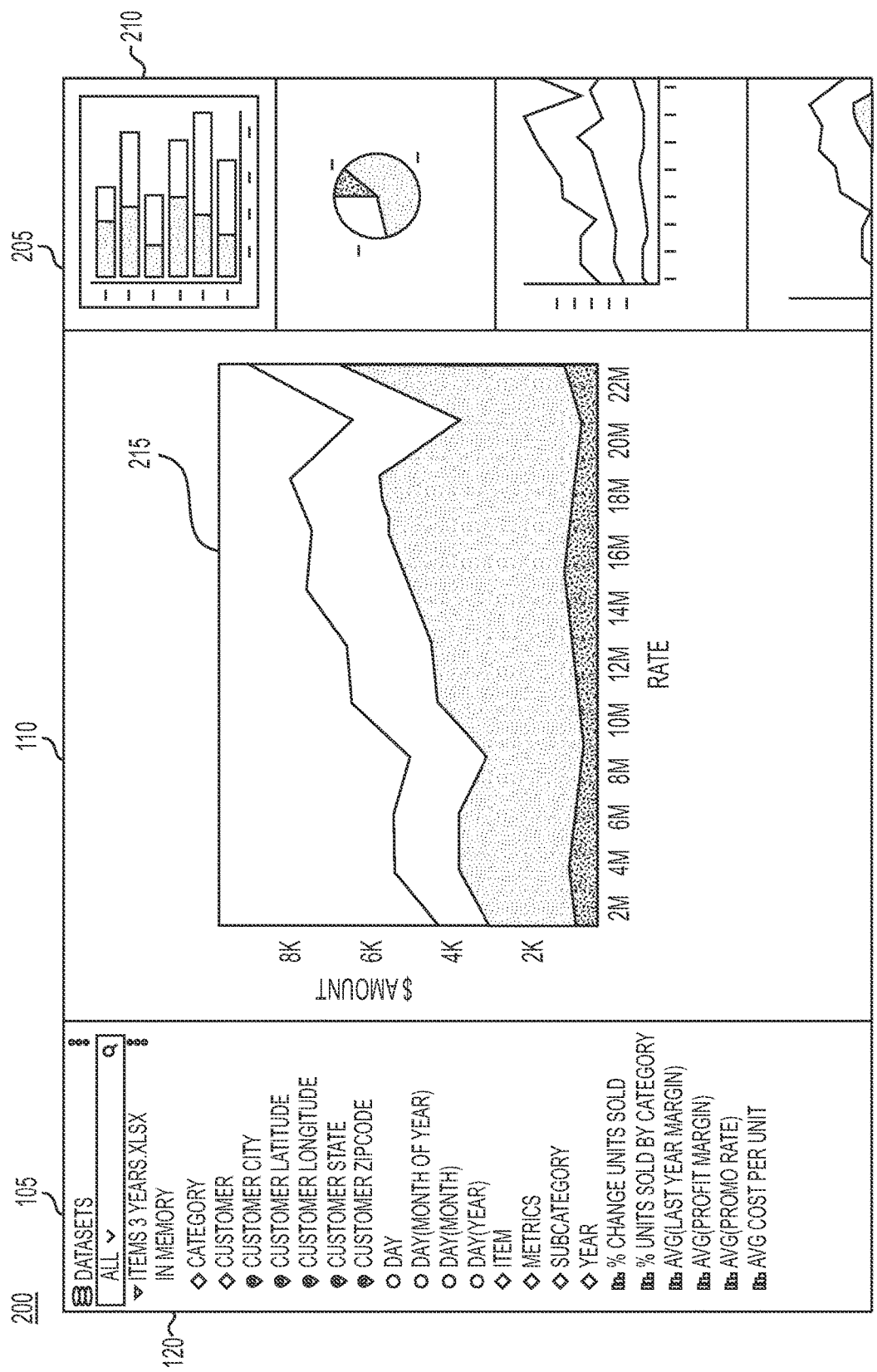
FIG. 2 depicts an exemplary user interface for selecting automatically generated suggested data visualizations, according to one or more embodiments.

These challenges resulting from the use of conventional visualization applications may be addressed by a visualization application in which suggested visualizations are provided based on the selected data for visualizations. Such suggested visualizations may be customized for the user of the visualization application. For example, FIG. 2 depicts an exemplary user interface for selecting automatically generated suggested data visualizations, according to one or more embodiments. As shown in FIG. 2, and similar to the user interface depicted in FIG. 1, a user interface for automatic generation of data visualizations 200 may include a canvas area 110 in which the visualization may be composed and previewed. A user interface for automatic generation of data visualizations 100 may also include a data selection pane 105 in which the user may select data items, such as data item 120, for visualization. However, unlike the conventional user interface depicted in FIG. 1, a user interface for automatic generation of data visualizations 200 may include a gallery of suggested visualizations 205. Gallery of suggested visualizations 205 may include one or more suggested visualizations 210. Other embodiments for presenting suggested embodiments may be contemplated. For example, a full page of suggested visualizations 205 may be presented upon the user selecting one or more of data items 120, or upon a request of the user. Each of suggested visualizations 210 may represent reduced-size or thumbnail views of a generated visualization and may be customized based on, for example, the selected data items 120, attributes of the user, a history of past visualizations, etc. The generation of suggested visualizations 210 will be described in greater detail below. Suggested visualizations 210 may be moved from gallery of suggested visualizations 205 to canvas area 110 by clicking and dragging, by contextual menus, or by any other suitable means. Once moved to canvas area 110, suggested visualizations 205 may be further customized by the user to create rendered visualizations, such as graph 215.

The generation of suggested visualizations, such as suggested visualizations 210 depicted in FIG. 2, may be based on a number of factors, including, for example, information about the user requesting the suggested visualizations, information about the data source and data items to be visualized, and information about other visualizations performed by the requesting user or other users relating to the data source and data items to be visualized or to other data sources and data items, etc. For example, a visualization model may be trained for each user based on past visualizations performed by the user or other users, and other available data. The trained visualization model may be based on, for example: metadata of the visualized data source and data items, such as whether the data source pertains to marketing data, production data, scientific data, etc., and the content of each data item, such as data type and content of the data item; information about the user's role in an organization, such as a corporate executive, a marketing developer, a data scientist, etc.; information about past visualizations performed by the user, such as a combination of data item metadata and selected visualizations; and/or information about past visualizations performed for the data source and data items, such as a combination of data item metadata and selected visualizations; etc. For example, if a new user selects a common data source, the user may see frequently selected types of visualizations and features for the selected data source. On the other hand, if an existing user selects an entirely new data source, enough information may be found in the past visualizations performed by the user, as well as the information about the user, in combination with metadata of the data source to provide suggestions for effective new visualizations. As the user selects suggests visualizations, modifies and customizes the selected visualizations, and accepts or approves the modified visualizations, the trained visualization models related to the user and the data source may be refined and updated to possibly improve future suggested visualizations for the user and the data source. The process of suggestion-selection-modification-approval may be consider as a "human in the loop" training for the visualization models. Exemplary processes for suggested visualizations and for training visualization models will be discussed below with respect to FIGS. 3-6.

Figure 3:
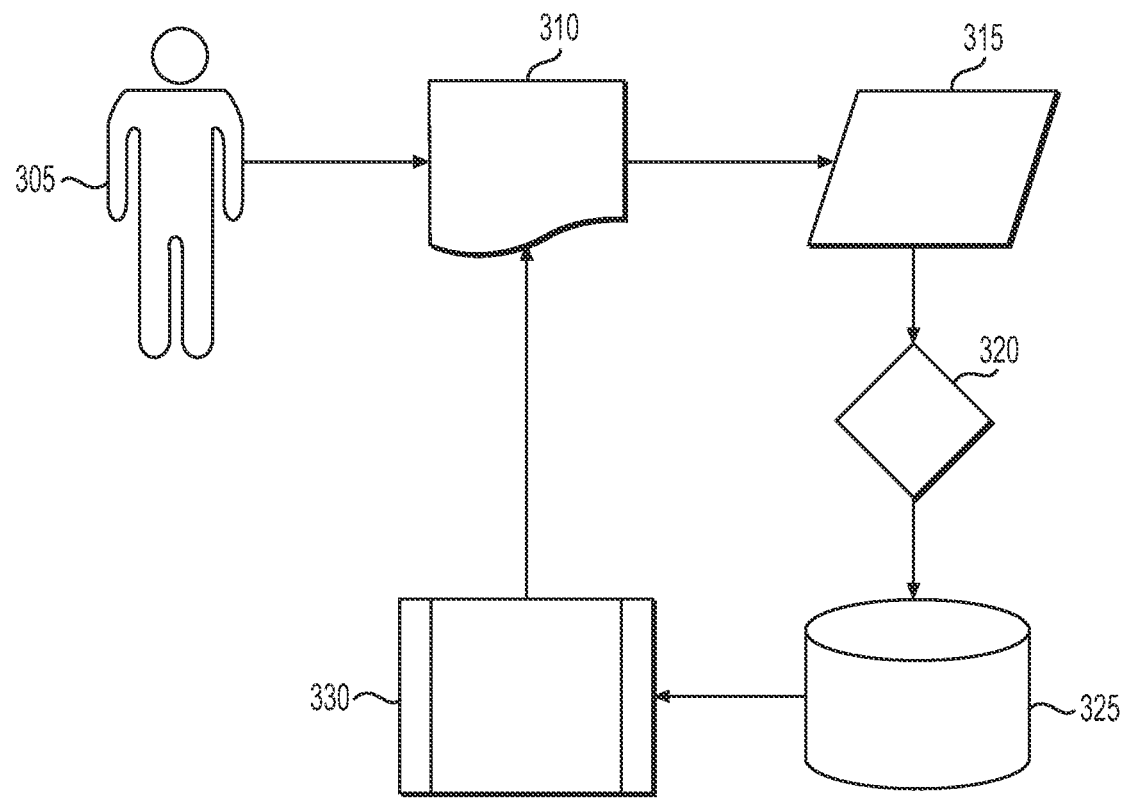
FIG. 3 depicts an exemplary process flow diagram for automatic generation of data visualizations, according to one or more embodiments.

FIG. 3 depicts an exemplary process flow diagram for a process 300 for the automatic generation of data visualizations, according to one or more embodiments. As shown in FIG. 3, when user 305 creates a new document 310 in which a data visualization may be presented, the user may select data source 315 for visualization. Upon the selection of data source 315 for visualization, a process according to one or more embodiments may determine whether an individual history and trained model user 305 is available, such as in data storage 325. The process may also determine whether trained models are available based on past visualizations performed within the user's organization or based on past visualizations performed for selected data source 315. Then, using a combination of the user's individual history and trained model, the organizational history and trained model, and past visualizations of the selected data source, the process may construct suggested visualizations 330. Suggested visualizations 330 may then be presented to user 305, such as in the context of document 310 or by way of a user interface such as user interface 200 depicted in FIG. 2.

Figure 4:
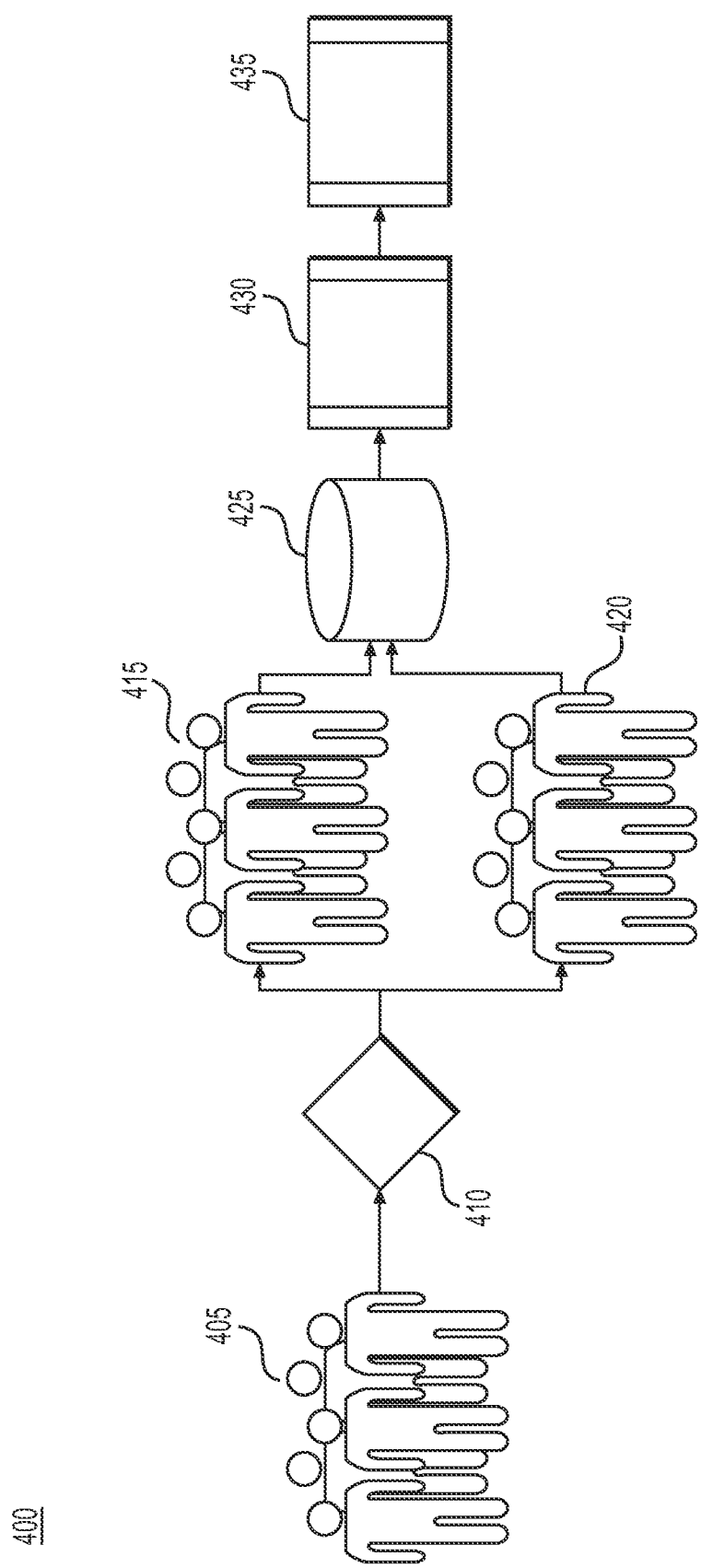
FIG. 4 depicts an exemplary process flow diagram for training a visualization model in a system for automatic generation of data visualizations, according to one or more embodiments.

As discussed above, generation of suggested visualization for selected data sources and data items, may include the application of trained visualization models. FIG. 4 depicts an exemplary process flow diagram for training a visualization model in a system for automatic generation of data visualizations, according to one or more embodiments. As shown in FIG. 4, a project, such as producing a document including one or more data visualizations, may be performed by one or more users, such as group of users 405. It is desirable to provide individualized data visualization models for each user among the group of users 405. However, the generation, updating, and maintaining of each trained data visualization model may be computationally expensive to perform. Accordingly, in order to possibly reduce this computational expense, users among the group of users 405 may be sorted in to high priority users 415, who may be provided with individualized data visualization models, and low priority users 420, who may be considered in aggregate to provide a group data visualization model. This assignment of high or low priority to users among the group of users 405 may be based, for example, on the role of the user within an organization, the number of past visualizations generated by the user for the selected data source or across all data sources, etc. For example, if computational resources are unlimited then all users may be considered high priority and each user may be provided with individualized data visualization models. Alternatively, if computational resources are somewhat limited, an organization using this process may use suitable organization metrics to determine high priority users and low priority users in order to provide individualized data visualization models to those for whom it will have the highest impact or usability. Alternatively, if computational resources are very limited then all users may be considered low priority and no users may be provided with individualized data visualization models. Information about the high or low priority assigned to each user may be stored in data about each user, such as in data storage 425. Each generated visualization model may be based on attributes of the data source and data items to be visualized. To that end, the data items may be parameterized, and a data parameterization 430 may be stored, such as in data storage 425, or in a separate data storage. Metadata for data items, such as data type (numerical, strings, dates, currency, range, etc.) may be notated in a format compatible with training visualization models, such as in a binary notation format shown in the Table 1 below. However, other representations of such parameterizations may be used. In addition, the metadata descriptions for data item attributes may be expanded beyond the descriptors listed here and in Table 1 to a desired degree of robustness, such as how well a model can handle outliers without sacrificing performance and accuracy.

TABLE 1

| Feature | Is_currency | Is_date | Is_Categorical |
|---|---|---|---|
| Dollar_sales | 1 | 0 | 0 |
| Date | 0 | 1 | 0 |
| Salesperson | 0 | 0 | 1 |

As a non-limiting example of such parameterization, consider a frequently-used data source that contains data items representing currency data and data ranges, and that is frequently used in a line chart to show profits over time. The data source may have metadata indicating which data items were used in generating a suggested profit chart. A new data source may then be accessed having data items with different names, but similar metadata. When a visualization is requested for the new data source, a visualization model trained based on the original data source and generated visualization may then suggest a profit chart. Without such parameterization of the data sources, it may not be possible to suggest visualizations until the new data source had been used in visualizations and the training of the visualization model updated. Such generalizations across datasets may be a significant advantage of a data visualization method according to one or more embodiments.

Following the parameterization of the data source, a visualization model 435 may be trained. A variety of methods of training visualization model 435 may be used. Any suitable classification model may be employed, such as, for example, artificial neural networks (ANN), Bayesian belief network, support vector machine, K nearest neighbors, decision tree, random forest, naïve Bayes, etc. The selection of a classification model may be made based on, for example, resource availability, simplicity of set up, and accuracy desired, etc.

The inputs used to generate and train visualization model 435 may include, for example, the existing visualizations within a project, and the associated datasets that were previously parameterized, etc. The outputs, or target classifications, of visualization model 435 may include, for example, the selected visualizations and the associated inputs. For example, a classification may be represented in JavaScript Object Notation (JSON):

{
Vis type: Line Chart,
Metric: $amount,
Attribute: Time
}

Implementing such a visualization model may be considered as an implementation of several models in parallel to determine each individual item in the output object. The results may then be aggregated so that the top suggested visualizations are stored and pre-rendered. Those suggested visualizations that do not render would be discarded, and the remaining results would be available to the user, such as in the suggested visualizations 205 portion of the user interface depicted in FIG. 2. In one or more embodiments, the presented visualizations may be sorted by aggregated metrics such that the top performing visualizations are presented first. In addition, the number of visualizations may be limited to a predetermined number or to visualizations with aggregated metrics exceeding a predetermined threshold. In such embodiments, the predetermined number of visualizations or the predetermined threshold may bet set by user preferences.

Figure 5:
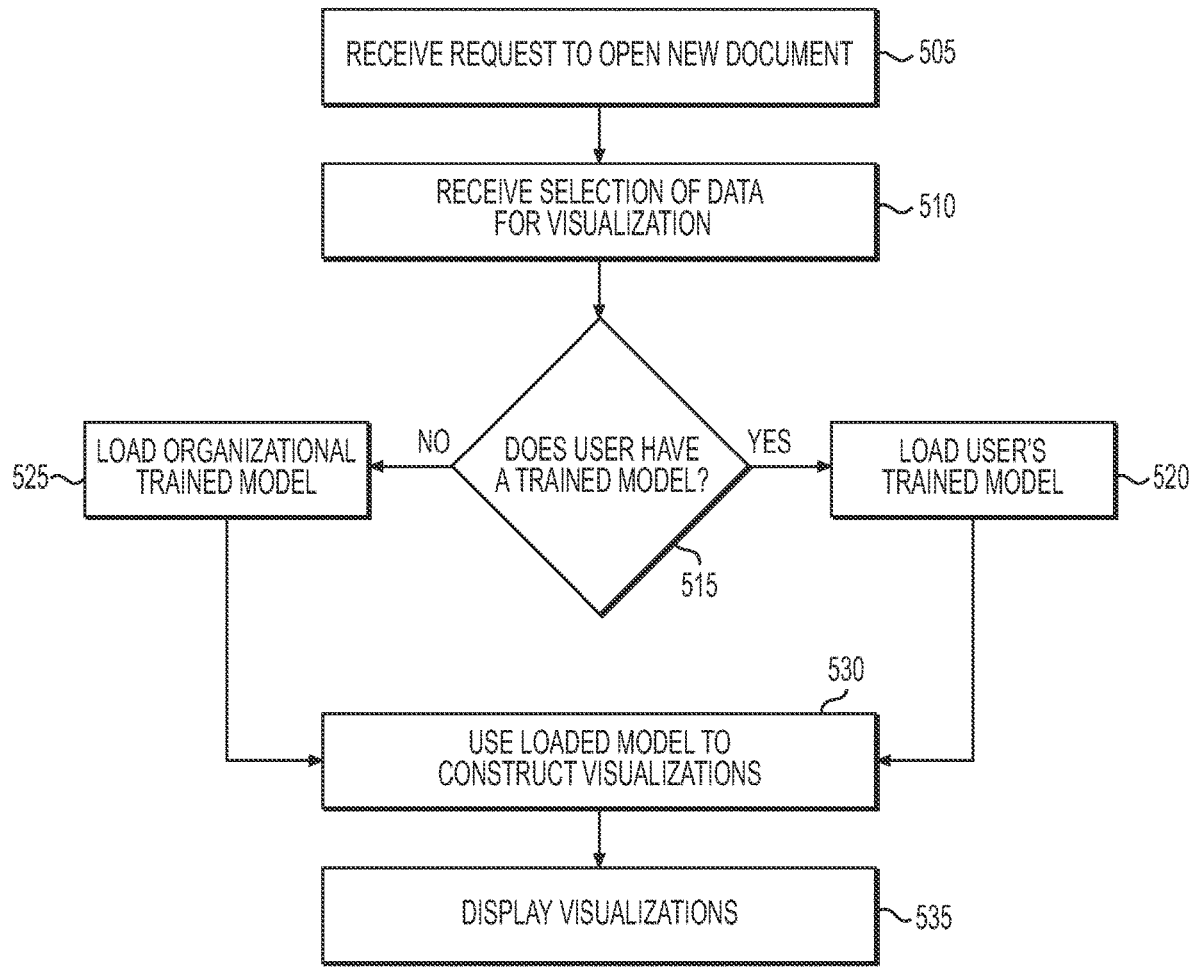
FIG. 5 depicts a flowchart of a method of automatic generation of data visualizations, according to one or more embodiments.

FIG. 5 depicts a flowchart of a method of automatic generation of data visualizations, according to one or more embodiments. In operation 505, the visualization generator may receive a user's request to open new document. In operation 510, the visualization generator may receive the user's selection of data for visualization. In operation 515, the visualization generator may determine if the user has a trained visualization model. If the user has a trained visualization model, then in operation 520, the visualization generator may load the user's trained model. If the user does not have a trained visualization model, then in operation 525, the visualization generator may load a default trained model, such as a model for an organization to which the user belongs or for a group of users. The loaded default trained model may then be used as an initial model for the user, which may be refined as the user performs additional visualizations. In operation 530, the visualization generator may use the loaded model to construct suggested visualizations for the selected data for visualization. In operation 535, the visualization generator may display the constructed suggested visualizations.

Figure 6:
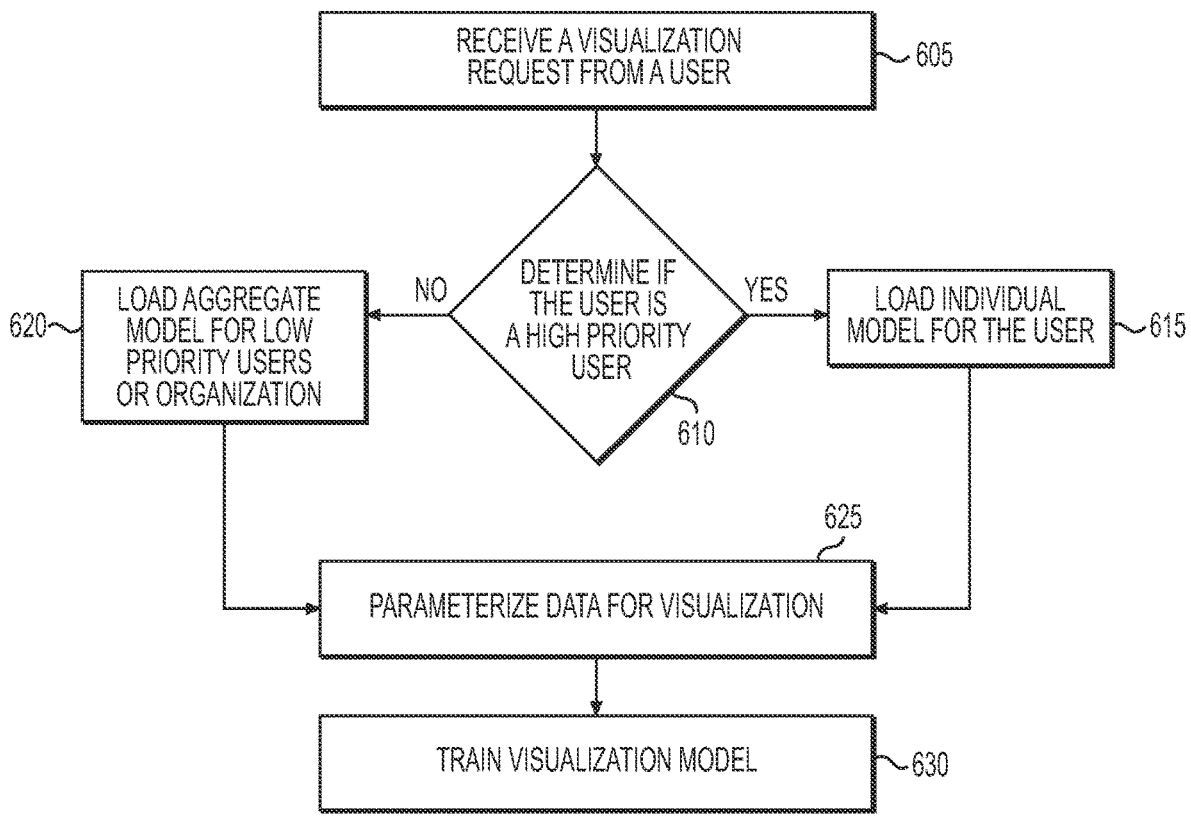
FIG. 6 depicts a flowchart of a method of training a visualization model in a system for automatic generation of data visualizations, according to one or more embodiments.

FIG. 6 depicts a flowchart of a method of training a visualization model in a system for automatic generation of data visualizations, according to one or more embodiments. In operation 605, the visualization generator may receive a visualization request from a user. In operation 610, the visualization generator may determine if the user is a high priority user. If the user is a high priority user, then in operation 615, the visualization generator may load an individual model for the user. If the user is not a high priority user, then in operation 620, the visualization generator may load an aggregated model. The aggregated model may be loaded for low priority users and/or for an organization to which the user belongs. In operation 625, the visualization generator may parameterize data selected for the user's requested visualization. In operation 630, the visualization generator may train the loaded visualization model using the parameterized data.

Producing visualized data according the embodiments disclosed herein may provide important advantages over conventional methods. For example, the described embodiments may produce visualizations with greater descriptive power for the data, and appropriate visualizations may be determined with less user effort in less time. The described embodiments may, thus, require fewer computing resources for data visualization.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback;

and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Techniques discussed herein may be executed on one or more webpages. Such web pages may execute HTML, or other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for automatic generation of data visualizations, the method comprising:
   receiving, from a user, a request to open a document;
   receiving, from the user, a selection of data for visualization in the document;
   determining whether the user has a trained visualization model;
   upon determining that the user has a trained visualization model, loading the user's trained visualization model;
   upon determining that the user does not have a trained visualization model, loading a default trained visualization model as the user's trained visualization model;
   using the user's trained visualization model to generate one or more suggested visualizations of the selected data; and
   displaying the one or more suggested visualizations to the user;
   receiving, from the user, a selection of a suggested visualization among the one or more suggested visualizations to add to the document;
   training the user's trained visualization model;
   wherein training the user's trained visualization model comprises:
      determining whether the user is a high priority user or a low priority user;
      upon determining that the user is a high priority user, loading an individual trained visualization model as the user's trained visualization model;
      upon determining that the user is a low priority user, loading an aggregated trained visualization model for low priority users as the user's trained visualization model;
      parameterizing the selected data for visualization to determine parameterized data; and
      training the user's trained visualization model based on the parameterized data, the selected visualization among the one or more suggested visualizations and the selected data for visualization.

2. The computer-implemented method of claim 1, wherein the default trained visualization model is the aggregated trained visualization model for one or more additional users, the aggregated trained visualization model comprising trained visualization models for the one or more additional users.

3. The computer-implemented method of claim 1, wherein generating the one or more suggested visualizations of the selected data is further based on information about the user, including a role of the user within an organization.

4. The computer-implemented method of claim 1, wherein parameterizing the selected data is based on data types of the selected data.

5. The computer-implemented method of claim 1, wherein the one or more suggested visualizations are displayed to the user in a sorted order.

6. A system for automatic generation of data visualizations, the system comprising:
   at least one data storage device storing instructions for automatic generation of data visualizations in an electronic storage medium; and
   at least one processor configured to execute the instructions to perform operations including:
   receiving, from a user, a request to open a document;
   receiving, from the user, a selection of data for visualization in the document;
   determining whether the user has a trained visualization model;
   upon determining that the user has a trained visualization model, loading the user's trained visualization model;

upon determining that the user does not have a trained visualization model, loading a default trained visualization model as the user's trained visualization model;

using the user's trained visualization model to generate one or more suggested visualizations of the selected data; and displaying the one or more suggested visualizations to the user;

receiving, from the user, a selection of a suggested visualization among the one or more suggested visualizations to add to the document;

training the user's trained visualization model;

wherein training the user's trained visualization model comprises:

determining whether the user is a high priority user or a low priority user;

upon determining that the user is a high priority user, loading an individual trained visualization model as the user's trained visualization model;

upon determining that the user is a low priority user, loading an aggregated trained visualization model for low priority users as the user's trained visualization model;

parameterizing the selected data for visualization to determine parameterized data; and training the user's trained visualization model based on the parameterized data, the selected visualization among the one or more suggested visualizations and the selected data for visualization.

7. The system of claim 6, wherein the default trained visualization model is the aggregated trained visualization model for one or more additional users, the aggregated trained visualization model comprising trained visualization models for the one or more additional users.

8. The system of claim 6, wherein generating the one or more suggested visualizations of the selected data is further based on information about the user, including a role of the user within an organization.

9. The system of claim 6, wherein parameterizing the selected data is based on data types of the selected data.

10. The system of claim 6, wherein the one or more suggested visualizations are displayed to the user in a sorted order.

11. A non-transitory machine-readable medium storing instructions that, when executed by a computing system, causes the computing system to perform operations for automatic generation of data visualizations, the operations comprising:

receiving, from a user, a request to open a document;

receiving, from the user, a selection of data for visualization in the document;

determining whether the user has a trained visualization model;

upon determining that the user has a trained visualization model, loading the user's trained visualization model;

upon determining that the user does not have a trained visualization model, loading a default trained visualization model as the user's trained visualization model;

using the user's trained visualization model to generate one or more suggested visualizations of the selected data; and displaying the one or more suggested visualizations to the user;

receiving, from the user, a selection of a suggested visualization among the one or more suggested visualizations to add to the document;

training the user's trained visualization model;

wherein training the user's trained visualization model comprises:

determining whether the user is a high priority user or a low priority user;

upon determining that the user is a high priority user, loading an individual trained visualization model as the user's trained visualization model;

upon determining that the user is a low priority user, loading an aggregated trained visualization model for low priority users as the user's trained visualization model;

parameterizing the selected data for visualization to determine parameterized data; and training the user's trained visualization model based on the parameterized data, the selected visualization among the one or more suggested visualizations and the selected data for visualization.

12. The non-transitory machine-readable medium of claim 11, wherein the default trained visualization model is the aggregated trained visualization model for one or more additional users, the aggregated trained visualization model comprising trained visualization models for the one or more additional users.

13. The non-transitory machine-readable medium of claim 11, wherein generating the one or more suggested visualizations of the selected data is further based on information about the user, including a role of the user within an organization.

14. The non-transitory machine-readable medium of claim 11, wherein parameterizing the selected data is based on data types of the selected data.

\* \* \* \* \*